US009659375B2

(12) United States Patent
Zagrodsky et al.

(10) Patent No.: US 9,659,375 B2
(45) Date of Patent: *May 23, 2017

(54) METHODS AND SYSTEMS FOR TRANSFORMING LUMINAL IMAGES

(71) Applicant: VOLCANO CORPORATION, San Diego, CA (US)

(72) Inventors: Vladimir Zagrodsky, El Dorado Hills, CA (US); Bernhard Sturm, Davis, CA (US); Elizabeth Begin, Billerica, MA (US); Jason Sproul, San Diego, CA (US)

(73) Assignee: Volcano Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,716

(22) Filed: Feb. 25, 2016

(65) Prior Publication Data

US 2016/0171701 A1    Jun. 16, 2016

Related U.S. Application Data

(63) Continuation of application No. 14/209,021, filed on Mar. 13, 2014, now Pat. No. 9,292,918, which is a (Continued)

(51) Int. Cl.
*G06K 9/00* (2006.01)
*G06T 7/00* (2017.01)
(Continued)

(52) U.S. Cl.
CPC ............ *G06T 7/0038* (2013.01); *G06T 5/002* (2013.01); *G06T 7/0012* (2013.01); *G06T 7/0014* (2013.01); *G06T 7/33* (2017.01); *G06T 7/337* (2017.01); *G06T 7/38* (2017.01); *G06T 2207/10068* (2013.01); *G06T 2207/10101* (2013.01); *G06T 2207/10132* (2013.01); *G06T 2207/10136* (2013.01); *G06T 2207/30101* (2013.01)

(58) Field of Classification Search
USPC ........ 382/100, 103, 106–107, 128–134, 154, 382/155, 162, 168, 173, 181, 209, 219, 382/224, 232, 254–260, 274–276, 382/286–291, 305, 312; 600/424, 437, 600/439, 585; 356/497
See application file for complete search history.

(56) References Cited

U.S. PATENT DOCUMENTS 8,047,996 B2 * 11/2011 Goodnow ................ A61B 8/12
600/437
8,049,900 B2 * 11/2011 Kemp .................. A61B 5/0066
356/497
(Continued)

*Primary Examiner* — Seyed Azarian

(57) ABSTRACT

The invention provides methods and systems for correcting translational distortion in a medical image of a lumen of a biological structure. The method facilitates vessel visualization in intravascular images (e.g. IVUS, OCT) used to evaluate the cardiovascular health of a patient. Using the methods and systems described herein it is simpler for a provider to evaluate vascular imaging data, which is typically distorted due to cardiac vessel-catheter motion while the image was acquired.

20 Claims, 14 Drawing Sheets

Related U.S. Application Data continuation-in-part of application No. 14/044,990, filed on Oct. 3, 2013, now Pat. No. 9,286,673.

(60) Provisional application No. 61/710,410, filed on Oct. 5, 2012, provisional application No. 61/781,660, filed on Mar. 14, 2013.

(51) Int. Cl.
| | |
|---|---|
| *G06T 5/00* | (2006.01) |
| *G06T 7/33* | (2017.01) |
| *G06T 7/38* | (2017.01) |
| *A61B 5/05* | (2006.01) |

(56) References Cited

U.S. PATENT DOCUMENTS

| | | | | |
|---|---|---|---|---|
| 8,052,605 B2* | 11/2011 | Muller | ............... | A61B 5/0062 |
| | | | | 600/439 |
| 8,100,838 B2* | 1/2012 | Wright | ............... | A61M 25/09 |
| | | | | 600/585 |
| 2011/0319752 A1* | 12/2011 | Steinberg | ............... | A61B 6/12 |
| | | | | 600/424 |

\* cited by examiner

METHODS AND SYSTEMS FOR TRANSFORMING LUMINAL IMAGES

RELATED APPLICATIONS

This application is a continuation of U.S. patent application Ser. No. 14/209,021, filed Mar. 13, 2014, which is a continuation-in-part of U.S. patent application Ser. No. 14/044,990, filed Oct. 3, 2013, which claims priority to U.S. Provisional Application No. 61/710,410, filed Oct. 5, 2012. U.S. patent application Ser. No. 14/209,021 also claims priority to U.S. Provisional Application No. 61/781,660, filed Mar. 14, 2013. The contents of all of the noted applications are incorporated by reference herein in their entireties.

FIELD OF THE INVENTION

The invention relates to methods and systems for correcting consecutive images of a lumen to compensate for motion of the lumen, motion of the imaging device, or variation of the placement of the imaging device with respect to the center of the lumen.

BACKGROUND

Medical imaging is commonly used to evaluate various biological structures of a patient. A common type of imaging system is a rotational medical imaging system (e.g., optical coherence tomography (OCT) or intravascular ultrasound (IVUS)). Those types of systems generally acquire images of an inside of an anatomical structure having a lumen, for example a blood vessel or other similar vasculature.

Typically, such rotational systems include an imaging body that rotates in a complete circle while being pulled back (or pushed forward) along a pre-defined longitudinal length. The motion of the device as it acquires image data results in a series of two dimensional image frames, each frame providing a 360° internal view of the vessel at a different location as the device moves through the vessel. A series of those frames can be combined to construct a three-dimensional image of an inside of the vessel. Three dimensional images allow for easier and more fluid viewing of vasculature anatomy and afford a clinician an ability to rapidly identify changes in a lumen border of the vasculature that are attributable to a disease state (e.g., an embolism or extent of arteriosclerosis).

Although rotational imaging systems have the potential for providing detailed images of the inside of vessels, the displayed image often includes various distortions arising during movement of the device through the lumen. For example, distortions can include images in a series appearing to be misaligned, improper display of vessel features due to the imaging device not precisely following the contours of the vessel, or distortion arising from the helical motion of the device as it is moved through the vessel. These distortions result in considerable intra- and inter-observer variability that may lead to conflicting or incorrect patient diagnosis.

SUMMARY OF THE INVENTION

The invention provides methods and systems for correcting translational distortion in a medical image of a lumen of a biological structure. The system assesses the position of the lumen with respect to one or more reference points for a first image and then determines the displacement of the first image from the reference point. The displacement of the first image is used to assess the displacements of the images immediately preceding and immediately following the first image. The displacement calculation is then performed iteratively for the entire data set and the measured displacements are used to establish a common reference, e.g., an average displacement. Once the common reference is established, each image is then transformed to compensate for the displacement with respect to the common reference, thus allowing a corrected image of the lumen to be created and displayed. A system of the invention includes a processor and memory upon which is stored instructions to carry out the steps above. Some embodiments of the system additionally comprise an imaging device, e.g., an imaging catheter.

The invention is generally applicable to data from any image gathering devices that acquire and process one, two, or three dimensional data sets from which three dimensional image compositions are derived. Exemplary devices include tomographic devices such as optical coherence tomography (OCT) devices, photo acoustic imaging devices, intravascular spectroscopy, intravascular magnetic resonance imaging, and ultrasound devices, including intravascular ultrasound spectroscopy (IVUS). The invention is particularly well suited for imaging devices that make a large number of measurements while rotating and translating, such as pullback catheter imaging devices.

Through the use of the image processing techniques described herein, the vascular structure border for all imaging frames, or any subsets thereof, in a recorded data set are corrected for image distortions and provided to the user. Corrected lumen border images are provided to the user in one, two and three dimensional image displays by the methods and systems provided. The resulting corrected lumen border may be displayed as the final tomographic image, the image longitudinal display (ILD), splayed image and three dimensional image. User interface graphics provide input for other indicators on a monitor interface, such as a color bar indicating the size of the lumen.

In other aspects, the invention embodies a system for displaying a medical image of a vessel. The system may use a monitor to display an image of the lumen of the biological structure, a central processing unit (CPU), and storage coupled to the CPU for storing instructions. The system may be configured so that the CPU obtains image data of a lumen of a biological structure from an imaging device and corrects the image data for translational distortions and displays a corrected image. Alternatively, the image data may be collected with a device and stored for later processing and use. In some embodiments, the system is used to correct images of intravascular lumen and the resulting images are displayed in a lumen-centric view.

The image data to be corrected may include any one of or combinations of splayed image data, image longitudinal display (ILD) data, three dimensional image data and tomographic image data. For example, tomographic image data that is acquired by an optical coherence tomography (OCT) catheter and corresponding OCT image data is particularly suited for the methods and systems described. Exemplary translational distortions to be corrected include frame alignment distortion, device angular distortion, and helical offset distortion.

In one example, compensating for frame alignment distortion includes identifying a reference position in each image frame and aligning each frame using the reference position. Another example of compensating for frame alignment includes aligning the reference position in all frames and calculating a new reference position from the aligned frames. A specific reference position can be the center of the lumen, but any reference position in the image frame can be used. Steps for aligning to the center of a lumen may include fitting a geometric shape to a lumen border, calculating a reference position within the area circumscribed by the geometric shape and aligning the image center to the reference position. The geometric shape to be fit to the lumen border includes, but is not limited to, a centroid, a circle or an ellipse. For greater consistency among frames for alignment purposes, the reference position can be smoothed across all image frames.

Another example includes compensating for angular distortion attributable to the imaging device. This example is generally accomplished as a multistep process. First, the method involves aligning a reference position of one frame with a catheter center position of a neighboring frame. Then, a longitudinal distance is determined between neighboring frames and an angle between two vectors is evaluated. The first vector is defined by a distance between a reference position in a first frame and a catheter center position in a neighboring frame, and the second vector may be defined by a distance between a reference position in a first frame and a reference position in said neighboring frame. Next, the neighboring frame is rotated about an axis through a value corresponding to the angle between the two vectors. The axis may be located in a plane defined by the neighboring frame, intersecting the catheter center position of the neighboring frame, and oriented perpendicular to a plane in which the first vector and second vector are located.

BRIEF DESCRIPTION OF THE DRAWINGS

In FIG. 10A the luminal images on the left are aligned with respect to the imaging axis, giving rise to an undulating longitudinal image on the right;

In FIG. 10B the luminal images on the left are aligned with respect to the vessel, giving rise to a longitudinal image with a substantially straight vessel but an undulating catheter image;

DETAILED DESCRIPTION

Figure 1:
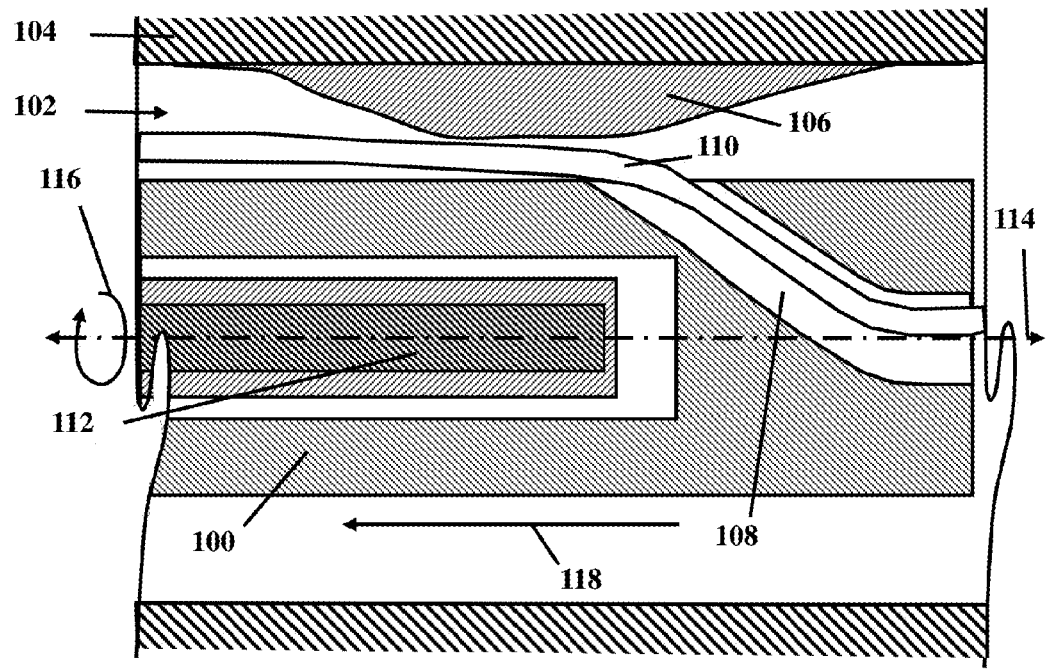
FIG. 1 illustrates a partial cross-sectional view of an imaging catheter suitable for use with a rotational imaging system.

The invention provides methods and systems for correcting translational distortion in a medical image of a lumen of a biological structure. The method facilitates vessel visualization in intravascular images (e.g. IVUS, OCT) used to evaluate the cardiovascular health of a patient. Using the methods and systems described herein it is simpler for a provider to evaluate vascular imaging data, which is typically distorted due to cardiac vessel-catheter motion while the image was acquired. The invention applies a motion correction algorithm to the images prior to generating vessel-centric images as an alternative to traditional catheter-centric display views.

Medical imaging is a general technology class in which sectional and multidimensional anatomic images are constructed from acquired data. The data can be collected from a variety of acquisition systems including, but not limited to, magnetic resonance imaging (MRI), radiography methods including fluoroscopy, x-ray tomography, computed axial tomography and computed tomography, optical coherence tomography (OCT), nuclear medicine techniques such as scintigraphy, positron emission tomography and single photon emission computed tomography, photo acoustic imaging ultrasound devices and methods including, but not limited to, intravascular ultrasound spectroscopy (IVUS), ultrasound modulated optical tomography, ultrasound transmission tomography, other tomographic techniques such as electrical capacitance, magnetic induction, functional MRI, optical projection and thermo-acoustic imaging, combinations thereof and combinations with other medical techniques that produce two- and three-dimensional images. At least all of these techniques are contemplated for use with the systems and methods of the present invention.

Medical imaging systems well suited for the present invention include rotational medical imaging systems. Exemplary rotational systems may use optical coherence tomography (OCT), or may include other types of imaging technology including, but not limited to, intravascular ultrasound spectroscopy (IVUS), RAMAN spectroscopy, alternative interferometric techniques, therapeutic or diagnostic delivery devices, pressure wires, and the like. In the case of an optical imaging system, light sources can be laser light, tunable laser light, multiple tunable laser lights with corresponding detectors, broadband light source, super-luminescent diode, tunable source, and the like.

Rotational system images (e.g. OCT and IVUS images) are acquired in the polar domain with coordinates of radius and angle (r, theta) but need to be converted to Cartesian coordinates (x, y) for display or rendering on a computer monitor. Typically, rotational systems consist of an imaging core which rotates and pulls back (or pushes forward) while recording an image video loop. This motion results in a three dimensional dataset of two dimensional image frames, where each frame provides a 360° slice of the vessel at different longitudinal locations. Although the exemplifications described herein are drawn to the invention as applied to OCT, the systems and methods are applicable to any imaging system, including at least those mentioned herein.

In some embodiments, the system can be used to correct images obtained with intravascular ultrasound imaging (IVUS). Accordingly, the imaging assembly can be a phased array IVUS imaging assembly, an pull-back type IVUS imaging assembly, or an IVUS imaging assembly that uses photoacoustic materials to produce diagnostic ultrasound and/or receive reflected ultrasound for diagnostics. IVUS imaging assemblies and processing of IVUS data are described for example in Yock, U.S. Pat. Nos. 4,794,931, 5,000,185, and 5,313,949; Sieben et al., U.S. Pat. Nos. 5,243,988, and 5,353,798; Crowley et al., U.S. Pat. No. 4,951,677; Pomeranz, U.S. Pat. No. 5,095,911, Griffith et al., U.S. Pat. No. 4,841,977, Maroney et al., U.S. Pat. No. 5,373,849, Born et al., U.S. Pat. No. 5,176,141, Lancee et al., U.S. Pat. No. 5,240,003, Lancee et al., U.S. Pat. No. 5,375,602, Gardineer et al., U.S. Pat. No. 5,373,845, Seward et al., Mayo Clinic Proceedings 71(7):629-635 (1996), Packer et al., Cardiostim Conference 833 (1994), "Ultrasound Cardioscopy," Eur. J.C.P.E. 4(2):193 (June 1994), Eberle et al., U.S. Pat. No. 5,453,575, Eberle et al., U.S. Pat. No. 5,368,037, Eberle et al., U.S. Pat. No. 5,183,048, Eberle et al., U.S. Pat. No. 5,167,233, Eberle et al., U.S. Pat. No. 4,917,097, Eberle et al., U.S. Pat. No. 5,135,486, and other references well known in the art relating to intraluminal ultrasound devices and modalities. All of these references are incorporated by reference herein.

Another medical imaging technique contemplated herein is optical coherence tomography (OCT). OCT systems and methods are generally described in Milner et al., U.S. Patent Application Publication No. 2011/0152771, Condit et al., U.S. Patent Application Publication No. 2010/0220334, Castella et al., U.S. Patent Application Publication No. 2009/0043191, Milner et al., U.S. Patent Application Publication No. 2008/0291463, and Kemp, N., U.S. Patent Application Publication No. 2008/0180683, the content of each of which is incorporated by reference in its entirety. OCT is a medical imaging methodology using a specially designed catheter with a miniaturized near infrared light-emitting probe attached to the distal end of the catheter. As an optical signal acquisition and processing method, it captures micrometer-resolution, three-dimensional images from within optical scattering media (e.g., biological tissue). OCT allows the application of interferometric technology to see from inside, for example, blood vessels, visualizing the endothelium (inner wall) of blood vessels in living individuals. OCT systems may be a spectrometer based OCT system or a Fourier Domain OCT, as disclosed in U.S. Patent Application No. 2009/0046295, herein incorporated by reference.

Commercially available optical coherence tomography systems are employed in diverse applications, including art conservation and diagnostic medicine, notably in ophthalmology where it can be used to obtain detailed images from within the retina. Recently it has also begun to be used in interventional cardiology to help diagnose coronary artery disease.

Various lumen of biological structures may be imaged with aforementioned imaging technologies in addition to blood vessels, including, but not limited, to vasculature of the lymphatic and nervous systems, various structures of the gastrointestinal tract including lumen of the small intestine, large intestine, stomach, esophagus, colon, pancreatic duct, bile duct, hepatic duct, lumen of the reproductive tract including the vas deferens, vagina, uterus and fallopian tubes, structures of the urinary tract including urinary collecting ducts, renal tubules, ureter, and bladder, and structures of the head and neck and pulmonary system including sinuses, parotid, trachea, bronchi, and lungs.

The arteries of the heart are particularly useful to examine with imaging devices such as OCT. OCT imaging of the coronary arteries can determine the amount of plaque built up at any particular point in the coronary artery. The accumulation of plaque within the artery wall over decades is the setup for vulnerable plaque which, in turn, leads to heart attack and stenosis (narrowing) of the artery. IVUS and OCT are useful in determining both plaque volume within the wall of the artery, and the degree of stenosis of the artery lumen. It can be especially useful in situations in which angiographic imaging is considered unreliable, such as for the lumen of ostial lesions or where angiographic images do not visualize lumen segments adequately. Example regions include those with multiple overlapping arterial segments. It is also used to assess the effects of treatments of stenosis such as with hydraulic angioplasty expansion of the artery, with or without stents, and the results of medical therapy over time.

FIG. 1 illustrates an exemplary catheter 100 for rotational imaging inside a lumen of any anatomical or mechanical conduit, vessel, or tube. The exemplary catheter 100 is suitable for in vivo imaging, particularly for imaging of an anatomical lumen or passageway, such as a cardiovascular, neurovascular, gastrointestinal, genitor-urinary tract, or other anatomical luminal structure. For example, FIG. 1 illustrates a vascular lumen 102 within a vessel 104 including a plaque buildup 106. The exemplary catheter 100 may include a rapid access lumen 108 suitable for guiding the catheter 100 over a guide-wire 110.

The exemplary catheter 100 is disposed over an exemplary rotational imaging modality 112 that rotates about a longitudinal axis 114 thereof as indicated by arrow 116. The exemplary rotational imaging modality 112 may comprise, in one embodiment, an OCT system. OCT is an optical interferometric technique for imaging subsurface tissue structure with micrometer-scale resolution. In another embodiment, the exemplary rotational imaging modality 112 may comprise an ultrasound imaging modality, such as an IVUS system, either alone or in combination with an OCT imaging system. An exemplary OCT system may include a tunable laser or broadband light source or multiple tunable laser sources with corresponding detectors, and may be a spectrometer based OCT system or a Fourier Domain OCT system, as disclosed in U.S. Patent Application Publication No. 2009/0046295, herein incorporated by reference. The exemplary catheter 100 may be integrated with IVUS by an OCT-IVUS system for concurrent imaging, as described in, for example, Castella et al. U.S. Patent Application Publication No. 2009/0043191 and Dick et al. U.S. Patent Application Publication No. 2009/0018393, both incorporated by reference in their entirety herein.

Figure 2:
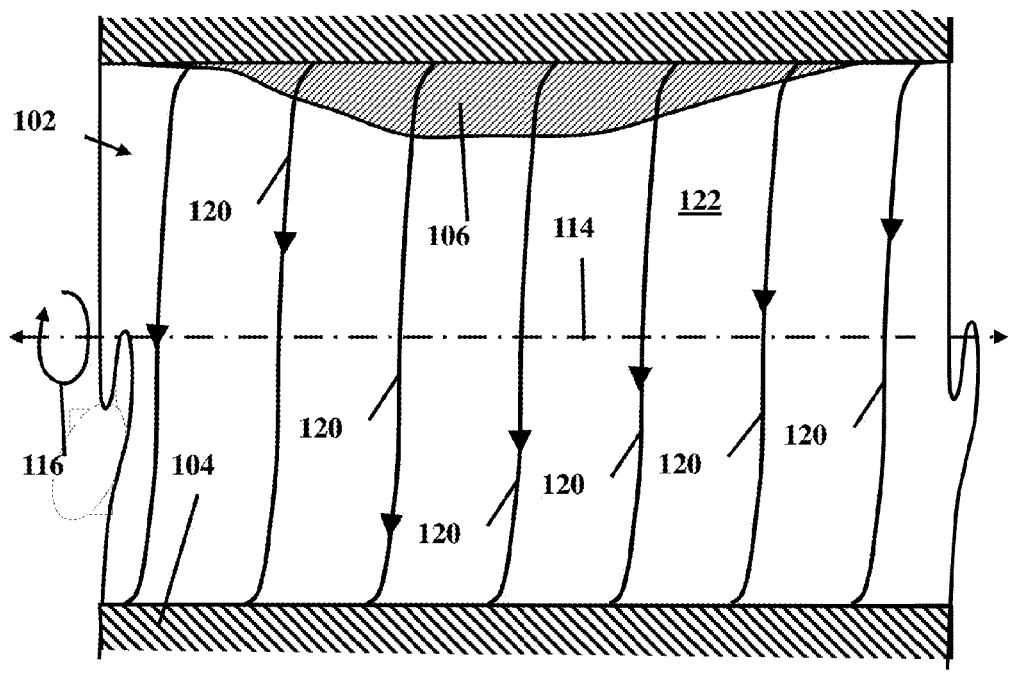
FIG. 2 illustrates a helical scanning pattern for a rotational imaging system.

Referring to FIGS. 1 and 2, the rotational imaging modality 112 may be longitudinally translated during rotation, as indicated by line 118 in FIG. 1. Thus, the rotational imaging modality 112 acquires data along a path 120 that includes a combination of rotation and/or longitudinal translation of the rotational imaging modality 112. FIG. 2 illustrates an exemplary path 120, which is a helical scanning pattern 120, resulting from such a combination. Because FIG. 2 is a cross-sectional view, the helical scanning pattern 120 is illustrated as would be traced on a rear half of a luminal surface 122 of the scanned vessel 104. The helical scanning pattern 120 facilitates scanning a three-dimensional space within and beneath the luminal surface 122 longitudinally as desired, but also introduces a data artifact commonly known as a seam line artifact during reconstruction of the data into a display frame, as will be further discussed herein below.

Referring to FIGS. 1 and 2, the longitudinal axis 114 is illustrated as linear for simplicity and clarity. However, the longitudinal axis 114 is not necessarily linear as illustrated. The longitudinal axis 114 may be curvilinear having a curvature following a tortuosity of the vessel 104. It will be understood that vessel 104 need not be linear, but may in fact have a curvilinear longitudinal axis 104 following the vessel 104 along a tortuous geometry, and that the present invention equally applicable to an imaging modality 112 longitudinally translated along the vessel 104 having a longitudinally linear and/or tortuous geometry.

Figure 3:
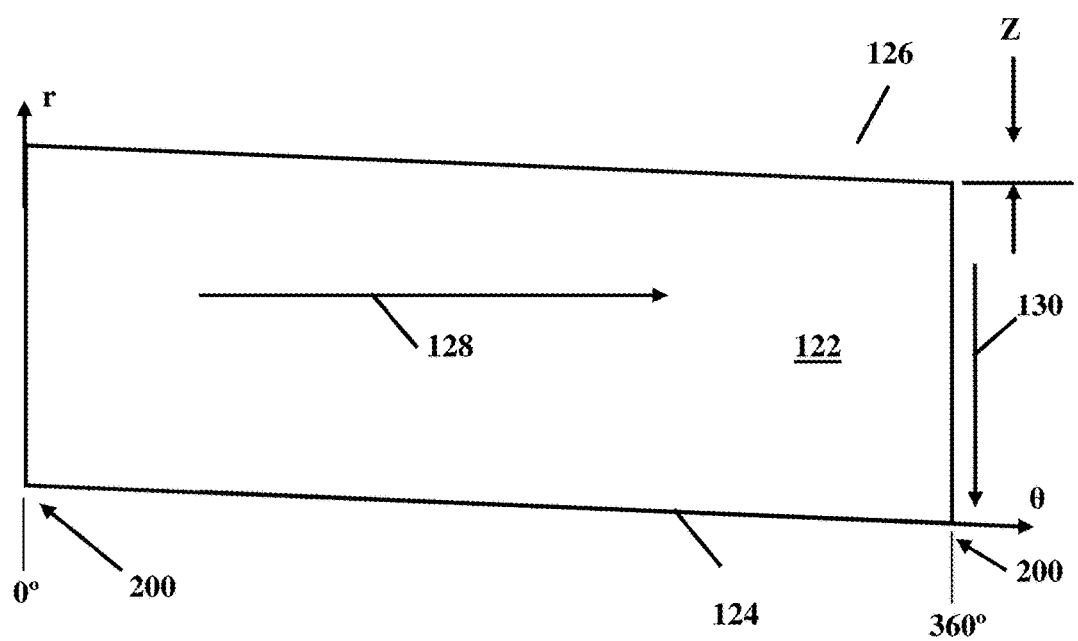
FIG. 3 illustrates the geometry of a data stream acquired using the helical scanning pattern of FIG. 2.

Referring to FIG. 3, a portion of the three dimensional space within and beneath the luminal surface 122 scanned within a single rotational period is projected into a planar (two-dimensional) format. In this format, line 126 represents a circumferential axis plotted horizontally. The geometry of a data stream acquired utilizing the above-described helical scan pattern 120 relative to the geometry of the luminal surface 122 may be represented by the parallelogram 124 disposed over the horizontal line 126 in FIG. 3. Starting at a fixed data acquisition angle 200 (hereinafter a "FDAA 200") conveniently denoted as zero degrees (0°) in FIG. 3, the rotational imaging modality 112 acquires data following a rotational path indicated by line 128 (parallel to the line 126) in FIG. 3. However, because the rotational imaging modality 112 may also be translated longitudinally, as indicated by line 130 in FIG. 3, the two-dimensional representation of the scanned three-dimensional space within and beneath the luminal surface 122 comprises the shape of the parallelogram 124. This means that at the end of one full rotation of the rotational imaging modality 112 as denoted in FIG. 3 by the FDAA 200 having a value of 360°, the rotational imaging modality 112 has translated longitudinally by a distance Z.

To perform the analysis of a clinical condition, images acquired with the rotational imaging devices are reconstructed in various display formats. However, the displayed images often have artifacts generated during the acquisition or processing of the acquired data. Artifacts arise from, for example, shadows in the lumen border from stents and guide wires used in the catheter portion of the imaging device. Other artifacts arise from any of a variety of dynamic motional effects including, for example, cardiac motion of the patient or external movement of the catheter.

Because all scans are relative to the catheter imaging core, the catheter is traditionally represented at the center of a tomographic image. Accordingly, other artifacts include lumen image distortions and frame to frame offset or misalignment of the lumen due to the catheter not being centrally located during translational motion. Such distortion is typically ascribed to the inherent tortuosity of the biological structure being imaged. Still other distortions arise from a discontinuity of the imaging data for a two-dimensional image slice as a result of the helical offset of the scan imaged. Such an offset arises from the combined rotational and translational motions of the imaging device, in which during a full 360° rotational scan the imaging core has translated longitudinally be a distance Z.

Figure 4:
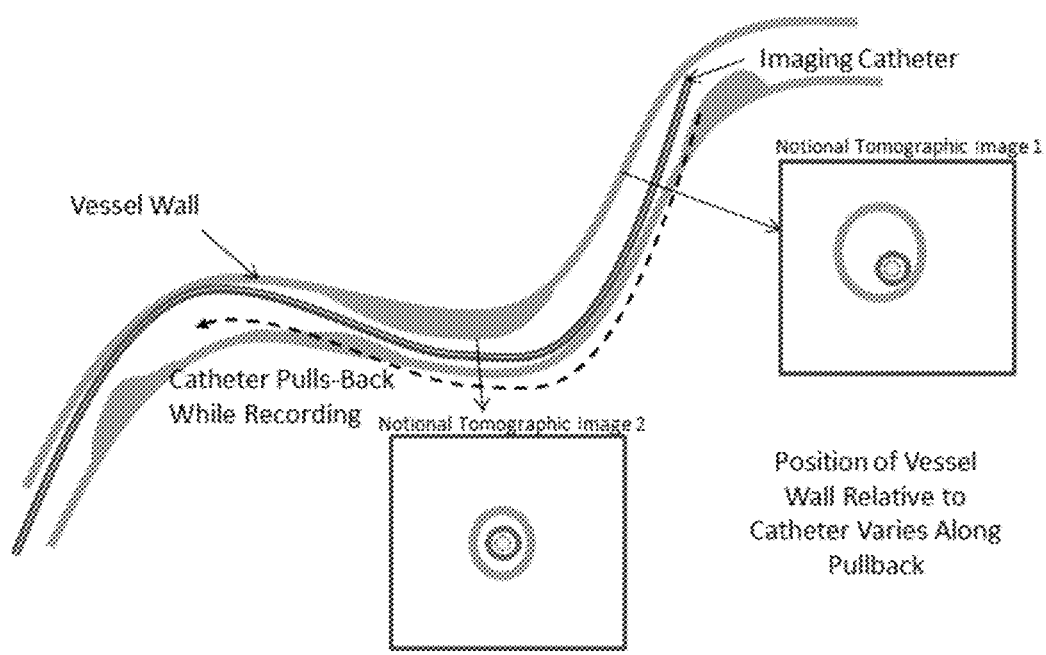
FIG. 4 illustrates an example of one source of distortion in OCT image data that is due to the change in position of a rotational imaging catheter relative to a vessel lumen wall as it is longitudinally displaced within the length of a vessel.
Figure 5:
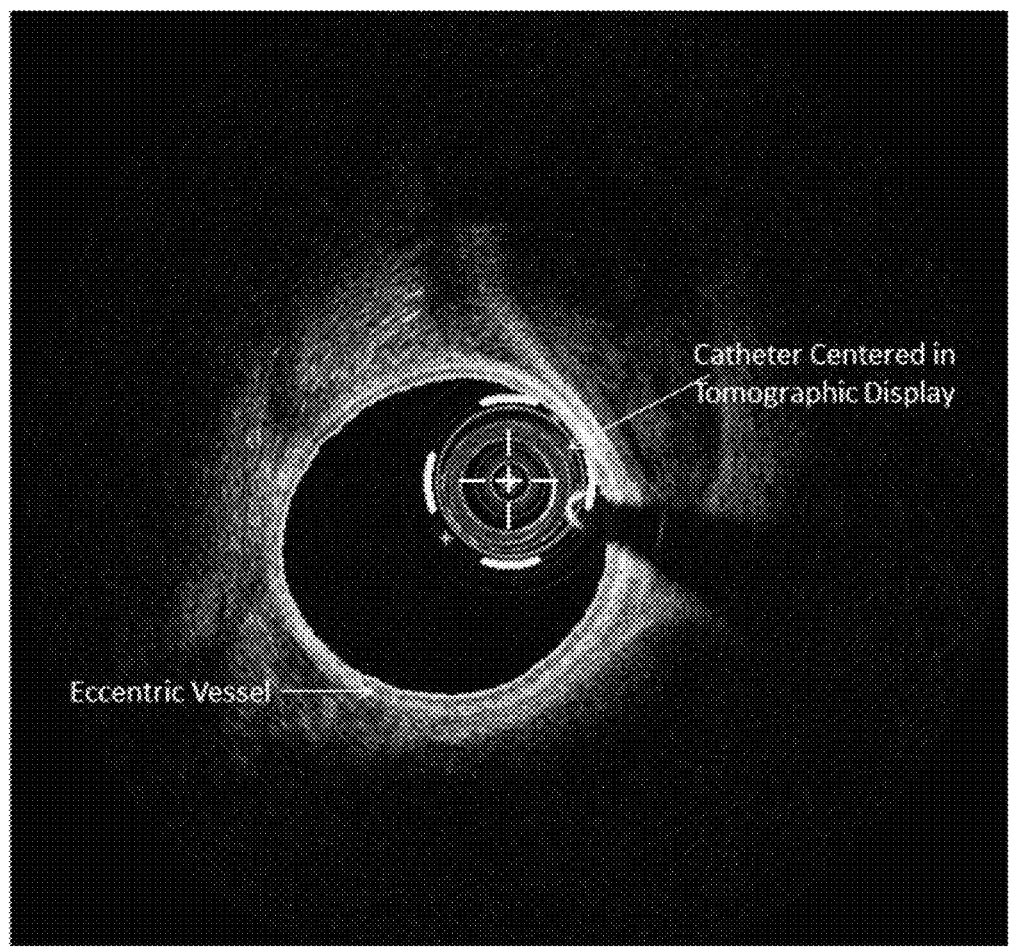
FIG. 5 shows a single frame image of a vessel lumen appearing off-center because the catheter occupies the center of the image.
Figure 6:
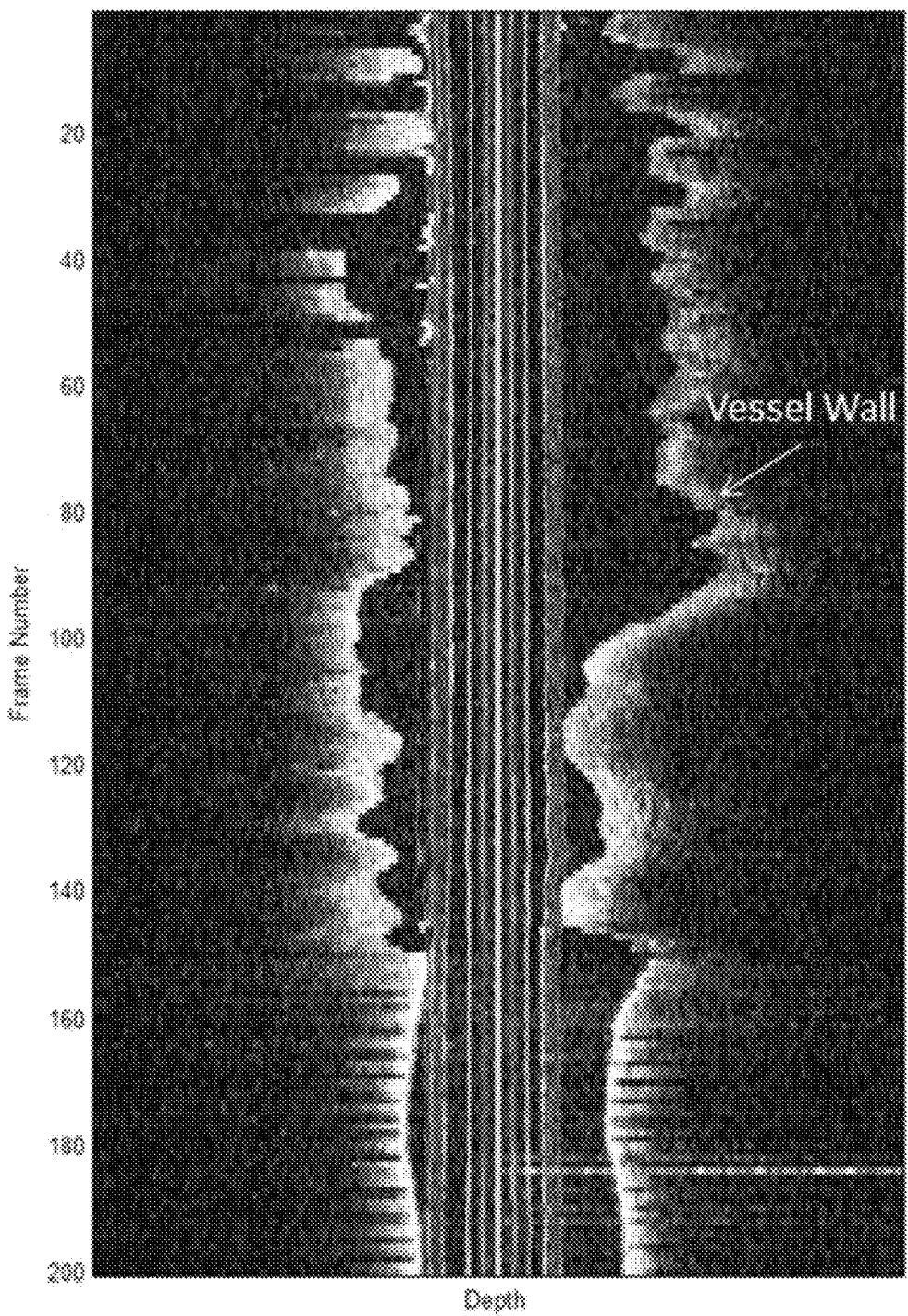
FIG. 6 shows an image longitudinal display (ILD) composed of a series of image frames where the catheter position varies relative to the lumen border. Each of the 200 individual lumen border images shifts out of alignment from other image frame lumen borders through the series, while the catheter remains in alignment.

Several image distortions commonly obtained from rotational imaging devices are described in FIGS. 4-8. Catheters generally have low ductility relative to a lumen and cannot conform exactly to the tortuous shape of, for example, a blood vessel in which it is imaging. FIG. 4 illustrates an example of one source of distortion in OCT image data that is due to the change in position of a rotational imaging catheter relative to a vessel lumen wall as it is longitudinally displaced within the length of a vessel. Because all images are relative to the catheter imaging core, the catheter always appears in the center of the image and successive images appear as though the vessel is shifting position around the catheter imaging core. This effect will cause the vessel at times to appear off-centered in the tomographic, splayed, two and three-dimensional images and Image Longitudinal Displays (ILD). FIG. 5 shows a single frame image of a vessel lumen appearing off-center because the catheter occupies the center of the image. FIG. 6 shows an ILD composed of a series of image frames where the catheter position varies relative to the lumen border. Each of the 200 individual lumen border images shifts out of alignment from other image frame lumen borders through the series, while the catheter remains in alignment. Thus, in either the tomographic or ILD image frames obtained during catheter pullback, the vessel may appear to move around the catheter.

Figure 7:
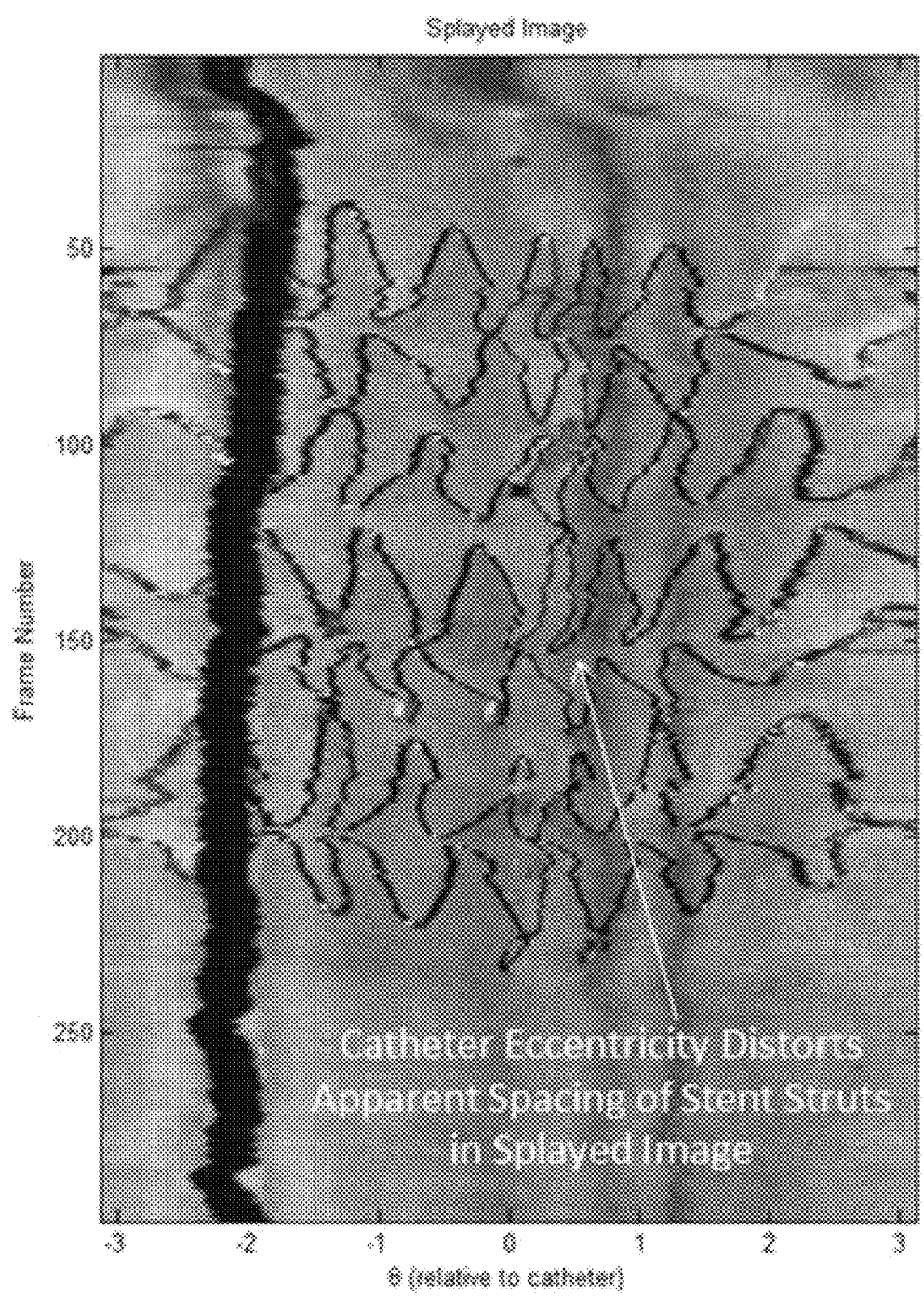
FIG. 7 shows an example of a splayed image two-dimensional map of a vessel pullback.

Another example of an image display type that often has a distorted presentation is a "splayed image." FIG. 7 shows an example of a splayed image two-dimensional map of a vessel pullback. The x-axis is rotational angle of the lumen border relative to the imaging device, and the y-axis is frame number. A splayed image is generated by integrating all pixel intensities beyond the vessel lumen border across all A-scans for all frames. Since a splayed image is constructed by integrating along A-scans, the coordinates of the resulting signal are presented relative to the catheter center, where the x-axis corresponds to the angle relative to the center of the image. The stent struts, due to their shadowing effect, are clearly seen in the image data. However, the angular spacing of the stent struts varies as caused by the eccentricity of the catheter during the pullback. The systems and methods described herein can be used to correct distortions and create a more accurate depiction of the stent distribution.

Figure 8:
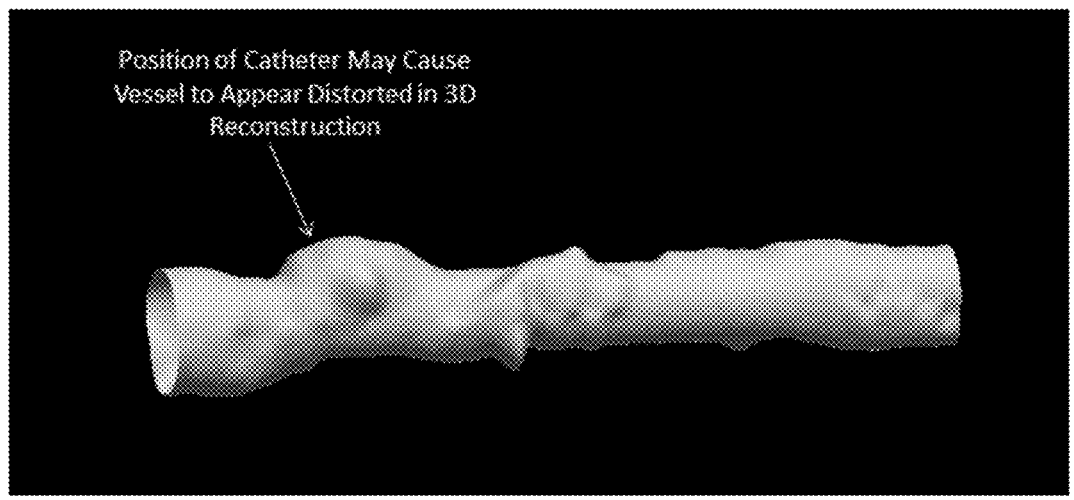
FIG. 8 shows a three dimensional surface display of vessel lumen border centered relative to an imaging catheter. The three-dimensional display is constructed from uncorrected two-dimensional images.

A three dimensional model of vessel wall is usually constructed through the acquisition of a series of two dimensional images, and therefore also may display distortions based on those present in the two-dimensional images. FIG. 8 shows a three-dimensional surface reconstruction of a vessel wall with distortional artifacts because it is constructed from uncorrected two-dimensional images. As in FIGS. 4-7, the position of the vessel wall is determined relative positioned to the catheter, and therefore the surface of the three-dimensional model is slightly distorted by the change in position of the catheter along the pullback.

To counteract these distortions, systems of the invention determine common reference points in the acquired data and then transform the data to produce a vessel-centric image that is easier to analyze and diagnose. In particular the invention uses a method in which (a) evaluates the geometric transformation sustained by a vessel between every neighbor pair of acquired images, then (b) filters the transformations accumulated during image acquisition, (c) computes the specific motion compensation to transform the images in order to get the vessel spatially stabilized, and finally (d) applies the transformations to the tomographic images and reconstructs longitudinal views of the vessel for display.

The primary advantage is the ability to create vessel-centric display views consistently stabilizing vessel position and orientation along a pullback. The known methods suffer from their inability to achieve vessel alignment for more than a few image frames, inability to compensate for significant vessel shift, and/or inability to hold the catheter within a longitudinal field of view. The secondary advantage is that longitudinal views are still directly generated from the acquired imaging scan lines, unlike other methods which include additional compensation-related scan conversions that cause interpolation artifacts.

The resultant vessel-centric views provide users with a clearer and more consistent visual appearance of the vessel anatomy than traditional catheter-centric views. Moreover, the vessel-centric image availability facilitates further automated analysis of the anatomy, for example, segmentation of lumen and adventitia, plaque characterization, and likewise. The method can be used in any intravascular procedures involving an imaging catheter in a coronary artery where physiologic cardiac motion occurs. It can be used in diagnostic and/or image-guided therapy purposes. It can be applied to different imaging modalities such as IVUS, OCT, intravascular spectroscopy, photo-acoustic tomography and similar. The method is not restricted to planar scanning in an imaging plane orthogonal to the vessel axis, and it is also applicable with conical scanning geometry such as used in forward-looking IVUS imaging.

Figure 9:
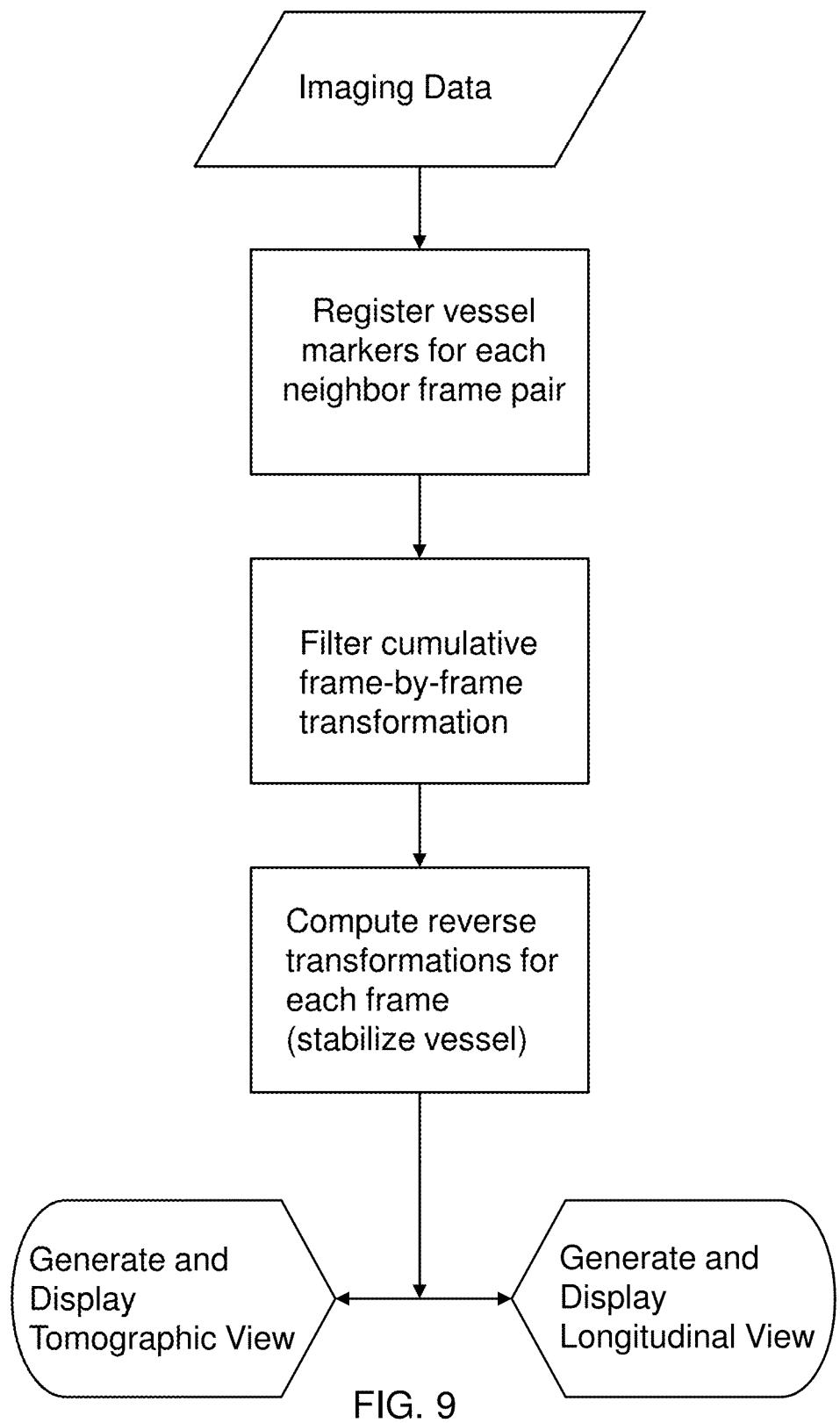
FIG. 9 is a flow chart illustrating an algorithm that may be used by a system of the invention.
Figure 10A:
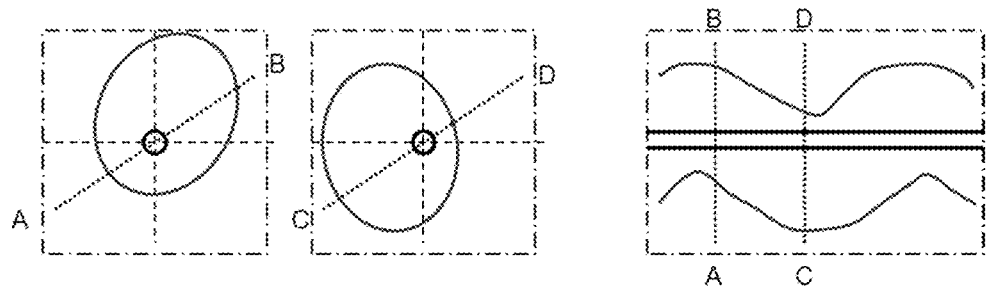
FIG. 10A illustrates the use of the algorithm of FIG. 9 to create a vessel-centric image.
Figure 10B:
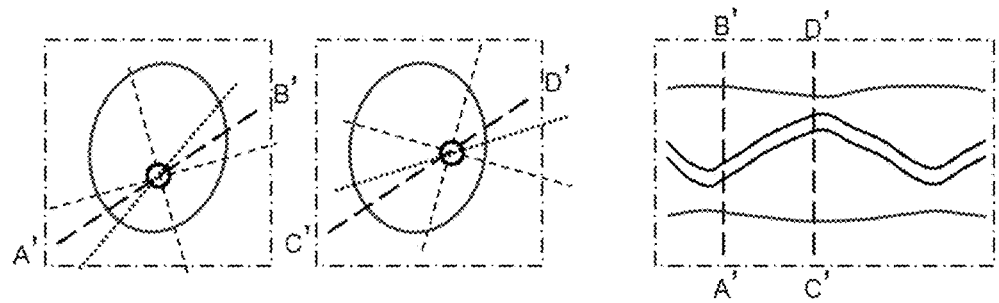
FIG. 10B illustrates an alternative use of the algorithm of FIG. 9 to create a vessel-centric image.

As described in FIG. 9, the method principally involves evaluating each image data set for vessel markers, and compiling the positions of the vessel markers to establish a transform function that is used to individually reverse transform each frame so that the corrected frames can be assembled into one or more images, e.g., tomographic views. As shown in FIGS. 10A and 10B, the imaging data may be acquired from an intravascular catheter in polar form, i.e., comprising a sequence of image frames consisting of radial scan lines. Alternatively, the image frames can be scan converted from polar to Cartesian prior to transformation.

Figure 11:
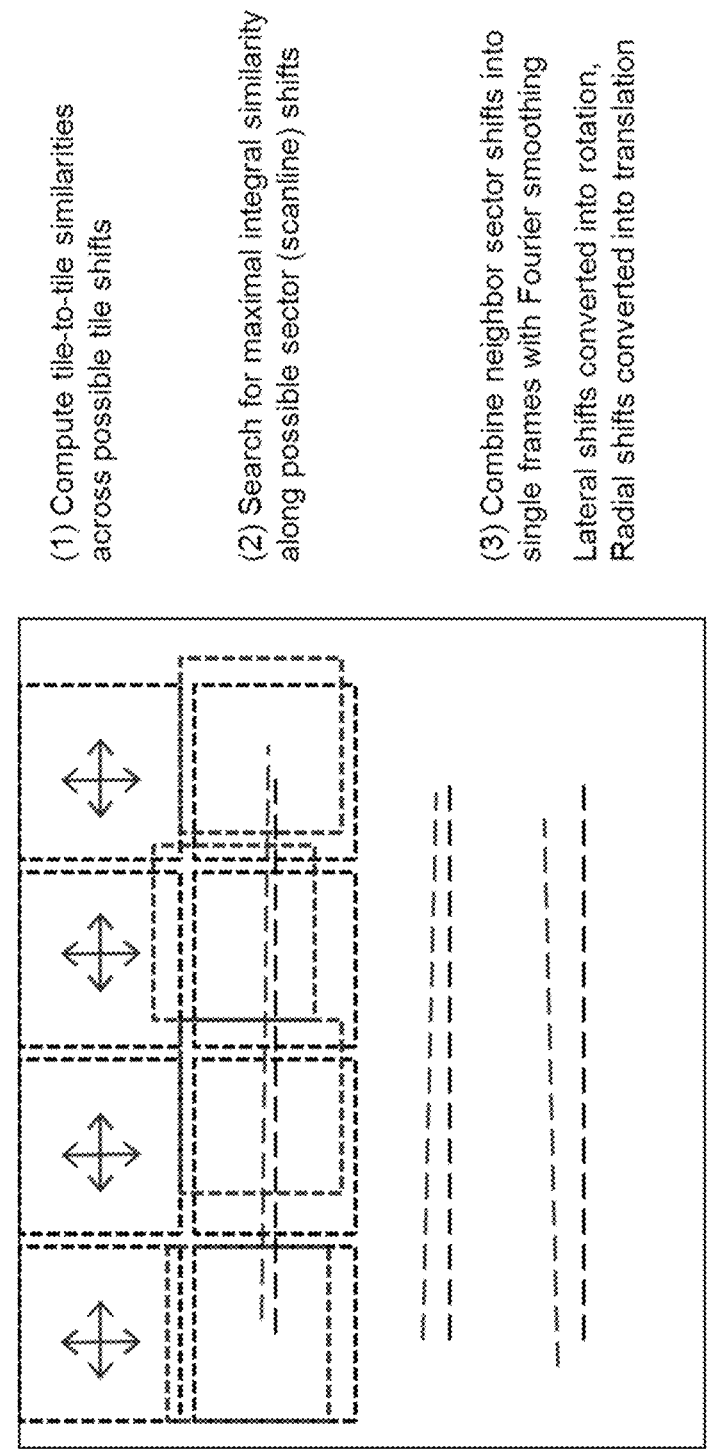
FIG. 11 illustrates an embodiment of the invention that maximizes tile-to-tile similarities to establish transform conditions for the data set.

In order to describe catheter-vessel motion quantitatively, the accrued vessel movements are detected using image registration methods such as rigid or non-rigid spatial transformations between each neighbor image frame pairs. For example, as shown in FIG. 11, the acquired polar images can be broken into a number of small tiles, local correlations are calculated for spatially shuffled tiles across frames, the local maxima corresponding to local radial and lateral translations are identified, and finally an integral rigid transformation best matching to the pattern of local translations is determined for the image as a whole in Cartesian space. The detected rigid transformations between each neighbor image frame pairs are continuously accumulated over a pullback. The accumulated transformation represents an integral spatial relation between the current frame and the first frames in a pullback.

While there is a potential for accumulation of stray errors for long frame sequences, such errors can be addressed by filtering the sequence of accumulated transformations. For example, a temporal filter may be applied to compensate for a DC offset and to smooth out any jitter caused by errors in detection of elementary transformations between neighboring frame pairs. In another instance the filtering step can employ two separate bandpass filters, one for the rotational and one for the translational components of the accumulated rigid transformation. Each of those filters can, for example, consist of a weighted average of the three most recent accumulated values to smooth out any jitter that is followed by a subtraction of a "longer term" averaged over sixty recent frames value to compensate for a DC offset. Once the filtered accumulated transformation for an image frame is obtained, motion compensation is computed to spatially align the vessel across the frame sequence. The computed compensation aims to present the vessel anatomy in the images as if there were no cardiac motion Once the transformation function has been identified, each tomographic frame is reverse transformed to normalize the entire image set. Based on a frame sequence and the corresponding sequence of compensation transformations, a series of stabilized tomographic frames can be produced, where the vessel appears stationary and the catheter appears to float within the vessel. As a result of compensating for the DC offset, the catheter floating is bounded by short-term cardiac motion within the few nearest cardiac cycles in the pullback and any drastic drift out of the field of view is prevented.

Figure 12A:
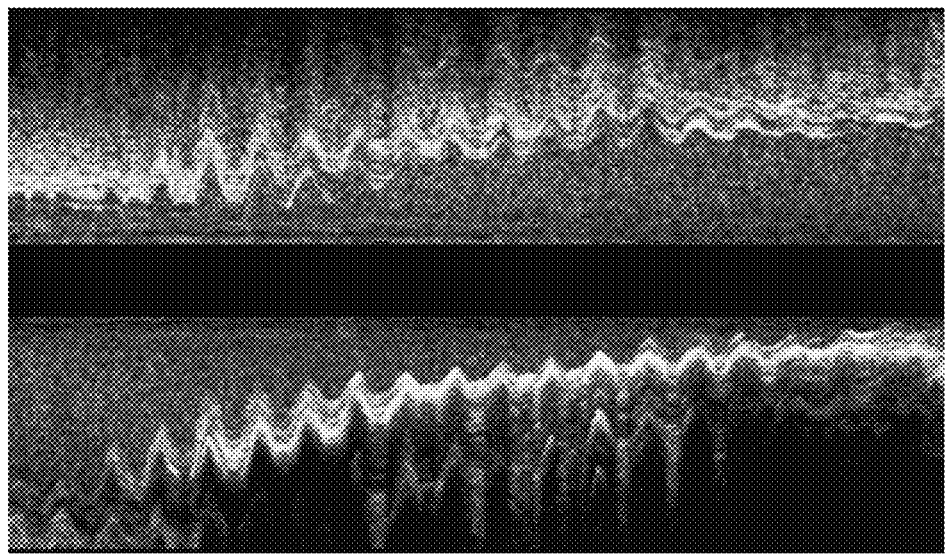
FIG. 12A shows an exemplary IVUS pullback ILD image with a catheter-centric image.
Figure 12B:
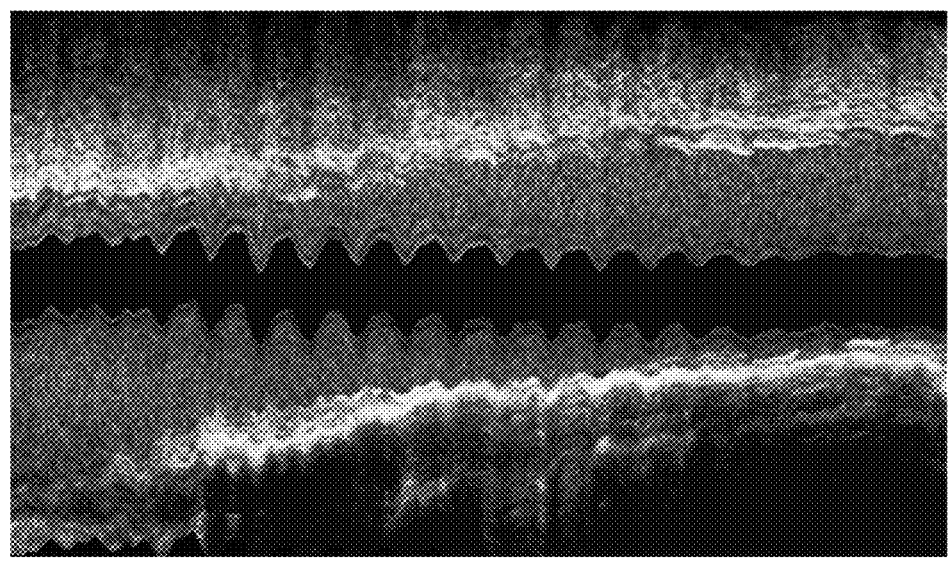
FIG. 12B shows the IVUS pullback ILD image after transformation to a vessel-centric image using a method of the invention. Variations in the vessel topology are much easier to identify in FIG. 12B, therefore increasing the likelihood of proper diagnosis.

The application of the algorithm of the invention to an IVUS vascular image is shown in FIGS. 12A and 12B. The ILD view represents a longitudinal cross-section through a sequence of frames created by selecting two diametrically opposed scan lines from each frame and stacking them into an image. In FIG. 12 A, the sequence of frames is assembled using the imaging axis as a reference point, which is standard method in many imaging systems. However, in FIG. 12B, the scan lines are assembled as a series of motion compensated frames. The filtered accumulated rigid transformation is decomposed into its rotational and translational components, and the rotational component is subtracted from the ILD view cross-sectional angle to determine the motion compensated diameter. Next, the selected scan lines are shifted radially within the ILD and the applied radial shift equals to the projection of the negative of the translational component discussed above. This radial shift allows the catheter center to float within the ILD view according to the detected motion. At the same time any transversal motion of the catheter center gets absorbed by the ILD view so that the entire motion compensated diameter remains visible, similarly to a curved multi-planar reconstruction commonly used in radiography.

In some embodiments, the composed ILD view is further placed into a viewport, for example cropped to a rectangular window and rendered in a display. Based on a frame sequence and a respective sequence of compensation transformations, any number of ILD views corresponding to a number of cross-sections with different view angles can be generated in parallel in order to let users interactively control the view angle being rendered.

Figure 13:
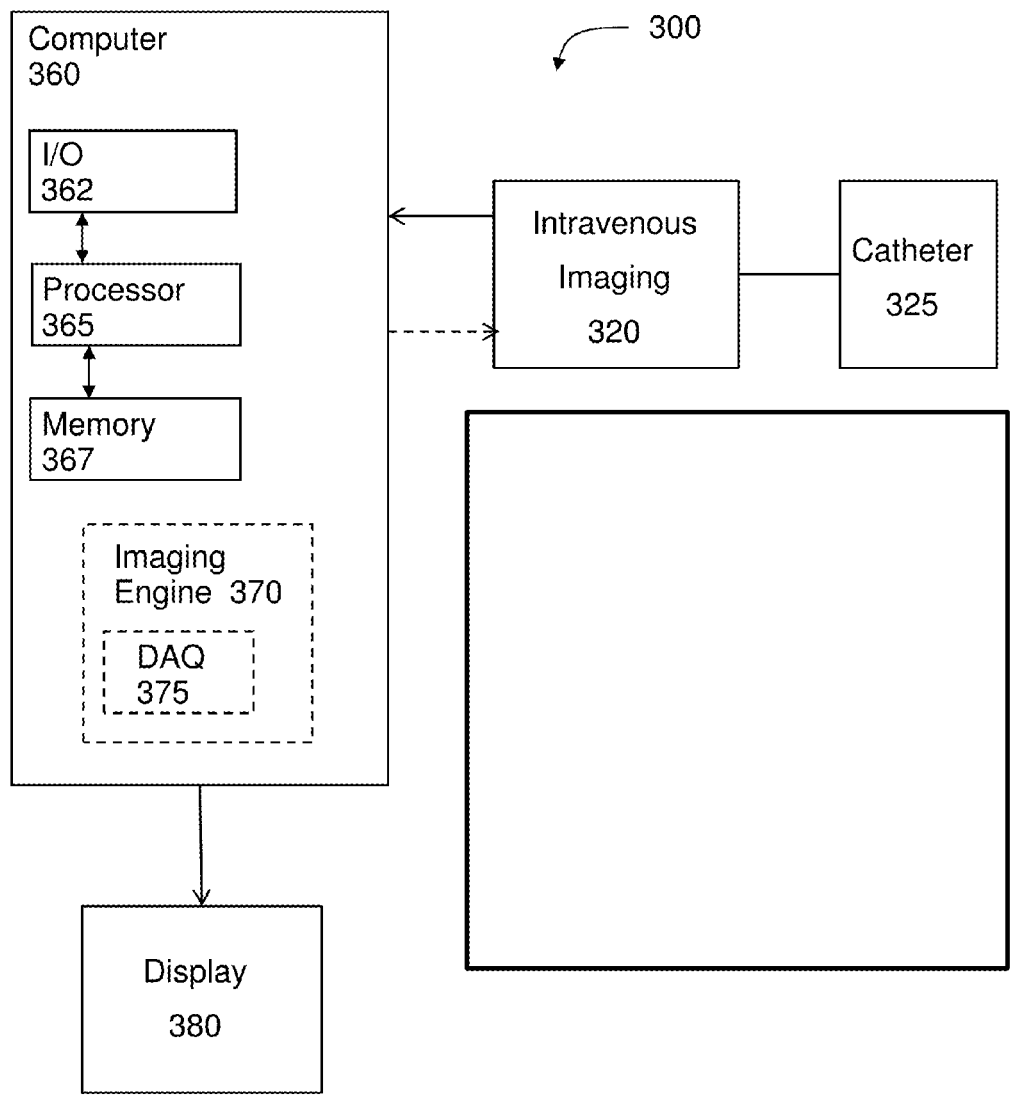
FIG. 13 is a block diagram of an exemplary system for correcting translational distortion in a medical image of a lumen.

A system of the invention may be implemented in a number of formats. An embodiment of a system 300 of the invention is shown in FIG. 13. The core of the system 300 is a computer 360 or other computational arrangement comprising a processor 365 and memory 367. The memory has instructions which when executed cause the processor to determine a baseline measurement prior to conducting a therapeutic procedure and determine a post-therapy measurement after conducting the therapeutic procedure. The instructions may also cause the computer to compare the post-therapy measurement to the baseline measurement, thereby determining the degree of post-therapy improvement after conducting the therapeutic procedure. The physiological measurement data of vasculature will typically originate from an intravascular measurement device 320, which is in electronic and/or mechanical communication with a sensing catheter 325. Having collected the baseline measurement and post-therapy measurement, the processor then processes and outputs the results. The results are typically output to a display 380 to be viewed by a physician or technician.

In advanced embodiments, system 300 may comprise an imaging engine 370 which has advanced image processing features, such as image tagging, that allow the system 300 to more efficiently process and display intravascular and angiographic images. The imaging engine 370 may automatically highlight or otherwise denote areas of interest in the vasculature. The imaging engine 370 may also produce 3D renderings or other visual representations of the physiological measurements. In some embodiments, the imaging engine 370 may additionally include data acquisition functionalities (DAQ) 375, which allow the imaging engine 370 to receive the physiological measurement data directly from the catheter 325 or collector 347 to be processed into images for display.

Other advanced embodiments use the I/O functionalities 362 of computer 360 to control the intravascular measurement 320. In these embodiments, computer 360 may cause the imaging assembly of catheter 325 to travel to a specific location, e.g., if the catheter 325 is a pull-back type. While not shown here, it is also possible that computer 360 may control a manipulator, e.g., a robotic manipulator, connected to catheter 325 to improve the placement of the catheter 325.

Figure 14:
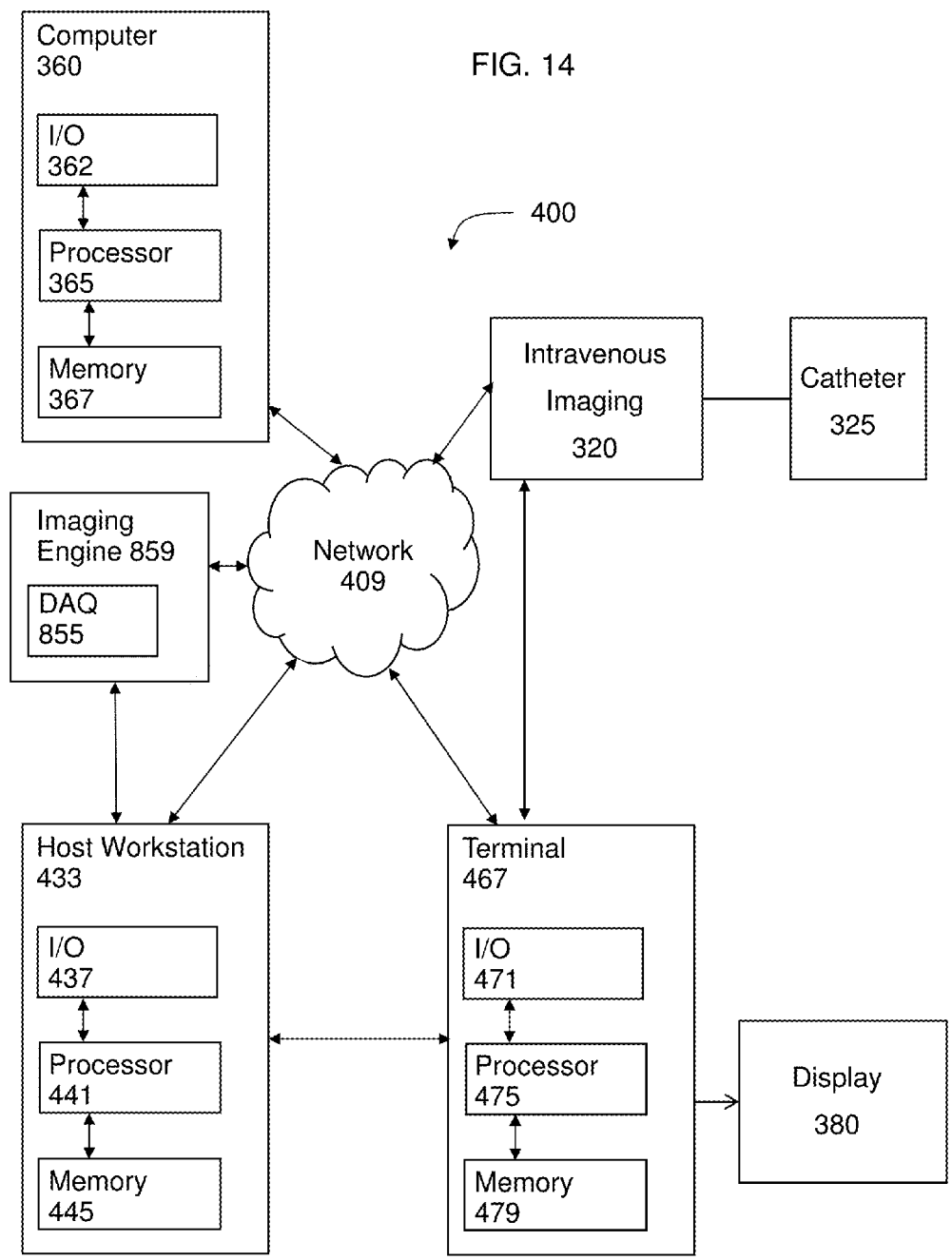
FIG. 14 is a block diagram of an exemplary system for correcting translational distortion in a medical image of a lumen.

A system 400 of the invention may also be implemented across a number of independent platforms which communicate via a network 409, as shown in FIG. 14. Methods of the invention can be performed using software, hardware, firmware, hardwiring, or combinations of any of these. Features implementing functions can also be physically located at various positions, including being distributed such that portions of functions are implemented at different physical locations (e.g., imaging apparatus in one room and host workstation in another, or in separate buildings, for example, with wireless or wired connections).

As shown in FIG. 14, the intravascular detecting system 320 facilitate obtaining the data, however the actual implementation of the steps can be performed by multiple processors working in communication via the network 409, for example a local area network, a wireless network, or the internet. The components of system 400 may also be physically separated. For example, terminal 467 and display 380 may not be geographically located with the intravascular detection system 320.

As shown in FIG. 14, imaging engine 859 communicates with host workstation 433 as well as optionally server 413 over network 409. In some embodiments, an operator uses host workstation 433, computer 449, or terminal 467 to control system 400 or to receive images. An image may be displayed using an I/O 454, 437, or 471, which may include a monitor. Any I/O may include a monitor, keyboard, mouse, or touch screen to communicate with any of processor 421, 459, 441, or 475, for example, to cause data to be stored in any tangible, nontransitory memory 463, 445, 479, or 429. Server 413 generally includes an interface module 425 to communicate over network 409 or write data to data file 417. Input from a user is received by a processor in an electronic device such as, for example, host workstation 433, server 413, or computer 449. In certain embodiments, host workstation 433 and imaging engine 855 are included in a bedside console unit to operate system 400.

In some embodiments, the system may render three dimensional imaging of the vasculature or the intravascular images. An electronic apparatus within the system (e.g., PC, dedicated hardware, or firmware) such as the host workstation 433 stores the three dimensional image in a tangible, non-transitory memory and renders an image of the 3D tissues on the display 380. In some embodiments, the 3D images will be coded for faster viewing. In certain embodiments, systems of the invention render a GUI with elements or controls to allow an operator to interact with three dimensional data set as a three dimensional view. For example, an operator may cause a video affect to be viewed in, for example, a tomographic view, creating a visual effect of travelling through a lumen of vessel (i.e., a dynamic progress view). In other embodiments an operator may select points from within one of the images or the three dimensional data set by choosing start and stop points while a dynamic progress view is displayed in display. In other embodiments, a user may cause an imaging catheter to be relocated to a new position in the body by interacting with the image.

In some embodiments, a user interacts with a visual interface and puts in parameters or makes a selection. Input from a user (e.g., parameters or a selection) are received by a processor in an electronic device such as, for example, host workstation 433, server 413, or computer 449. The selection can be rendered into a visible display. In some embodiments, an operator uses host workstation 433, computer 449, or terminal 467 to control system 400 or to receive images. An image may be displayed using an I/O 454, 437, or 471, which may include a monitor. Any I/O may include a keyboard, mouse or touch screen to communicate with any of processor 421, 459, 441, or 475, for example, to cause data to be stored in any tangible, nontransitory memory 463, 445, 479, or 429. Server 413 generally includes an interface module 425 to effectuate communication over network 409 or write data to data file 417. Methods of the invention can be performed using software, hardware, firmware, hardwiring, or combinations of any of these. Features implementing functions can also be physically located at various positions, including being distributed such that portions of functions are implemented at different physical locations (e.g., imaging apparatus in one room and host workstation in another, or in separate buildings, for example, with wireless or wired connections). In certain embodiments, host workstation 433 and imaging engine 855 are included in a bedside console unit to operate system 400.

Processors suitable for the execution of computer program include, by way of example, both general and special purpose microprocessors, and any one or more processor of any kind of digital computer. Generally, a processor will receive instructions and data from a read-only memory or a random access memory or both. The essential elements of computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, NAND-based flash memory, solid state drive (SSD), and other flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having an I/O device, e.g., a CRT, LCD, LED, or projection device for displaying information to the user and an input or output device such as a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server 413), a middleware component (e.g., an application server), or a front-end component (e.g., a client computer 449 having a graphical user interface 454 or a web browser through which a user can interact with an implementation of the subject matter described herein), or any combination of such back-end, middleware, and front-end components. The components of the system can be interconnected through network 409 by any form or medium of digital data communication, e.g., a communication network. Examples of communication networks include cell networks (3G, 4G), a local area network (LAN), and a wide area network (WAN), e.g., the Internet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include programming language known in the art, including, without limitation, C, C++, Perl, Java, ActiveX, HTML5, Visual Basic, or JavaScript.

A computer program does not necessarily correspond to a file. A program can be stored in a portion of file 417 that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over network 409 (e.g., as packets being sent from a server to a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment) into patterns of magnetization by read/write heads, the patterns then representing new collocations of information desired by, and useful to, the user. In some embodiments, writing involves a physical transformation of material in tangible, non-transitory computer readable media with certain properties so that optical read/write devices can then read the new and useful collocation of information (e.g., burning a CD-ROM). In some embodiments, writing a file includes using flash memory such as NAND flash memory and storing information in an array of memory cells include floating-gate transistors. Methods of writing a file are well-known in the art and, for example, can be invoked automatically by a program or by a save command from software or a write command from a programming language.

In certain embodiments, display 380 is rendered within a computer operating system environment, such as Windows, Mac OS, or Linux or within a display or GUI of a specialized system. Display 380 can include any standard controls associated with a display (e.g., within a windowing environment) including minimize and close buttons, scroll bars, menus, and window resizing controls. Elements of display 380 can be provided by an operating system, windows environment, application programming interface (API), web browser, program, or combination thereof (for example, in some embodiments a computer includes an operating system in which an independent program such as a web browser runs and the independent program supplies one or more of an API to render elements of a GUI). Display 380 can further include any controls or information related to viewing images (e.g., zoom, color controls, brightness/contrast) or handling files comprising three-dimensional image data (e.g., open, save, close, select, cut, delete, etc.). Further, display 380 can include controls (e.g., buttons, sliders, tabs, switches) related to operating a three dimensional image capture system (e.g., go, stop, pause, power up, power down).

In certain embodiments, display 380 includes controls related to three dimensional imaging systems that are operable with different imaging modalities. For example, display 380 may include start, stop, zoom, save, etc., buttons, and be rendered by a computer program that interoperates with IVUS, OCT, or angiogram modalities. Thus display 380 can display an image derived from a three-dimensional data set with or without regard to the imaging mode of the system.

Figure 15:
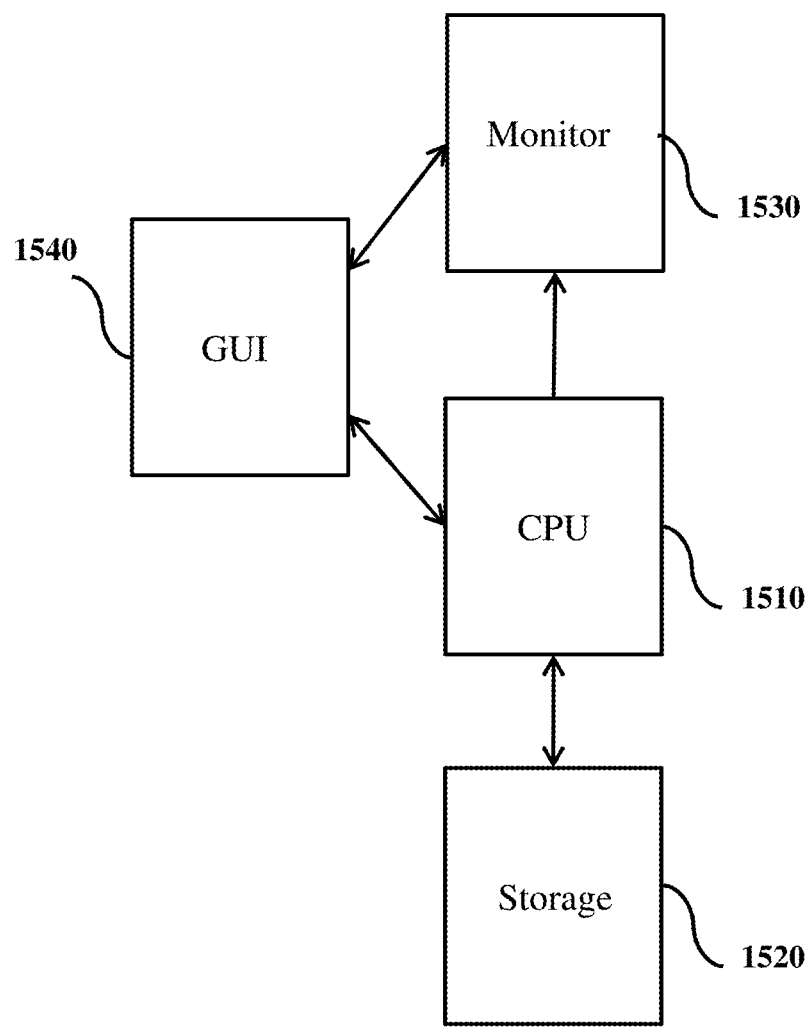
FIG. 15 is a block diagram of an exemplary system for correcting translational distortion in a medical image of a lumen.

Alternatively, an imaging data set may be assessed, analyzed, and transformed with a system such as the system shown in FIG. 15, comprising CPU 1510, storage 1520, and monitor 1530. Storage 1520 may contain instructions for carrying out methods of the invention, e.g., to configure CPU 1510 to analyze the imaging data set for a parameter, assign an indicator to the medical device based on the presence of the parameter, and display the indicator on monitor 1530. For example CPU 1510 may direct monitor 1530 to display a longitudinal image of a lumen with a color-coded stent. In some embodiments, a system of the invention will additionally comprise graphical user interface (GUI) 1540, which allows a user to interact with the images. In some embodiments, CPU 1510, storage 1520, and monitor 1530 may be encompassed within system 2400.

The systems and methods of use described herein can be performed using any type of computing device, such as a computer, that includes a processor or any combination of computing devices where each device performs at least part of the process or method. In some embodiments, systems and methods described herein may be performed with a handheld device, e.g., a smart tablet, or a smart phone, or a specialty device produced for the system.

In some embodiments, a device of the invention includes an OCT imaging system and obtains a three-dimensional data set through the operation of OCT imaging hardware. In some embodiments, a device of the invention is a computer device such as a laptop, desktop, or tablet computer, and obtains a three-dimensional data set by retrieving it from a tangible storage medium, such as a disk drive on a server using a network or as an email attachment.

Methods of the invention can be performed using software, hardware, firmware, hardwiring, or combinations of any of these. Features implementing functions can also be physically located at various positions, including being distributed such that portions of functions are implemented at different physical locations (e.g., imaging apparatus in one room and host workstation in another, or in separate buildings, for example, with wireless or wired connections).

Any target can be imaged by methods and systems of the invention including, for example, bodily tissue. In certain embodiments, systems and methods of the invention image within a lumen of tissue. Various lumen of biological structures may be imaged including, but not limited to, blood vessels, vasculature of the lymphatic and nervous systems, various structures of the gastrointestinal tract including lumen of the small intestine, large intestine, stomach, esophagus, colon, pancreatic duct, bile duct, hepatic duct, lumen of the reproductive tract including the vas deferens, vagina, uterus and fallopian tubes, structures of the urinary tract including urinary collecting ducts, renal tubules, ureter, and bladder, and structures of the head and neck and pulmonary system including sinuses, parotid, trachea, bronchi, and lungs.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

The invention claimed is:

1. A system for transforming an image of a lumen, comprising:
   a processor; and
   storage coupled to the processor, the storage comprising instructions that when executed cause the processor to:
   receive data corresponding to a first image of a lumen;
   receive data corresponding to a second image of a lumen;
   register coordinates of at least two points on the lumen in the first and second images of the lumen, the at least two points on the lumen in the first and second images comprise locations on a center of the lumen or on a lumen border;
   compare the coordinates of the at least two points on the lumen in the first image of the lumen to the coordinates of the at least two points on the lumen in the second image of the lumen;
   determine a translation to align the at least two points on the lumen in the first image of the lumen and the at least two points on the lumen in the second image of the lumen; and
   translate the first image or the second image of the lumen to align the at least two points on the lumen in the first image of the lumen and the at least two points on the lumen in the second image of the lumen.

2. The system of claim 1, wherein the storage additionally comprises instructions to cause the processor to output data corresponding to an image comprising the first and second images of the lumen.

3. The system of claim 2, wherein image comprising the first and second images is selected from a splayed image, an image longitudinal display (ILD) image, a three dimensional image, a tomographic image, or a combination thereof.

4. The system of claim 1, wherein the lumen is a vessel.

5. The system of claim 1, wherein the data corresponding to the images of the lumen is acquired with optical coherence tomography (OCT).

6. The system of claim 1, wherein the data corresponding to the images of the lumen is acquired with intravenous ultrasound imaging (IVUS).

7. The system of claim 1, wherein the translated image corrects for frame alignment distortion, device angular distortion, device translational distortion, helical offset distortion, cardiac motion distortions, or combination thereof.

8. The system of claim 7, wherein the translated image corrects for frame alignment distortions.

9. The system of claim 1, wherein the first and second images are taken consecutively in time.

10. The system of claim 1, wherein the at least two points on the lumen in the first image are points on the lumen border.

11. The system of claim 1, wherein the storage additionally comprises instructions that cause the processor to smooth the data corresponding to an image comprising the first and second images of the lumen.

12. A method comprising:
   receiving, at a processor coupled to tangible, non-transitory storage, data corresponding to a first image of a lumen;
   receiving, at the processor, data corresponding to a second image of a lumen;
   registering, in the tangible, non-transitory storage using the processor, coordinates of at least two points on the lumen in the first and second images of the lumen, the at least two points on the lumen in the first and second images comprise locations on a center of the lumen or on a lumen border;
   comparing, using the processor, the coordinates of the at least two points on the lumen in the first image of the lumen to the coordinates of the at least two points on the lumen in the second image of the lumen;
   determining, using the processor, a translation to align the at least two points on the lumen in the first image of the lumen and the at least two points on the lumen in the second image of the lumen; and
   translating, using the processor, the first image or the second image of the lumen to align the at least two points on the lumen in the first image of the lumen and the at least two points on the lumen in the second image of the lumen.

13. The method of claim 12, further comprising outputting data corresponding to an image comprising the first and second images of the lumen.

14. The method of claim 13, further comprising smoothing the data corresponding to an image comprising the first and second images of the lumen.

15. The method of claim 13, wherein the image comprising the first and second images of the lumen is selected from a splayed image, an image longitudinal display (ILD) image.

16. The method of claim 12, further comprising acquiring the data corresponding to the first and second images of the lumen with optical coherence tomography (OCT).

17. The method of claim 12, further comprising acquiring the data corresponding to the first and second images of the lumen with intravenous ultrasound imaging (IVUS).

18. The method of claim 12, the translating step further comprising correcting for frame alignment distortion, device angular distortion, device translational distortion, helical offset distortion, cardiac motion distortions, or combinations thereof.

19. The method of claim 18, the translating step further comprising correcting for frame alignment distortions.

20. The method of claim 18, wherein the first and second images are taken consecutively in time.

\* \* \* \* \*